United States Patent Office 3,143,512
Patented Aug. 4, 1964

3,143,512
ADDITION OF BARIUM SULPHATE TO SEALANTS USED IN FAYING SURFACE TYPE JOINTS
Paul C. Kline, Baltimore, Md., assignor, by mesne assignments, to the United States of America as represented by the Secretary of the Navy
No Drawing. Original application July 19, 1961, Ser. No. 125,281. Divided and this application Jan. 29, 1963, Ser. No. 262,283
2 Claims. (Cl. 252—478)

The present invention relates to sealing and inspection of joints in various structures which must withstand pressure introduced by fluids which are contained by or are external to the structure. This application is a division of copending U.S. application Serial No. 125,281, filed July 19, 1961, by the present applicant.

Those concerned with the development of sealants for making weather and pressure tight joints and fuel tanks in aircraft have long recognized a need for a satisfactory technique for evaluation of the quantity and distribution of the sealant once the joints have been sealed. The problem is especially critical in connection with determination of voids at faying surfaces of the sealed joints in fuel tanks immediately after assembly and during service. At present the only positive technique is to actually disassemble the tank. Other techniques, such as filling the tank with nitrous oxide and passing a leak detector along the seam, do not provide an adequately positive test. The present invention abrogates these difficulties by providing positive but simple inspection of sealant condition without expensive and time consuming tank disassembly.

The general purpose, therefore, of this invention is to provide a sealant and a technique which will permit rapid, positive evaluation of the condition of the sealant in joints and faying surfaces without time consuming disassembly.

It is an object of the present invention to provide a simple and inexpensive method for sealing structural elements whereby the quality of the newly formed seal can be readily evaluated without dissassembly of the freshly joined structural elements or resorting to inadequate technique such as gaseous leak tests.

It is a further object to provide a method for rapid periodic evaluation of sealed joints after having been subjected to in-service operation.

It is still a further object to provide a sealant of special composition which will permit simple and inexpensive determination of voids in or deficiency of sealant at the sealed joint at any time after assembly.

In accordance with my invention, the joints are sealed with a sealant normally used for the specific application. However, mixed in with the sealant is a predetermined quantity of material which has a relatively high X-ray absorption coefficient. Consequently, once the joint is sealed, an X-ray analysis can be made of the joint to provide a positive, non-destructive determination of the condition of the seal. An X-ray photograph will reveal the existence of voids and show up areas where sealant is deficient or has shifted during service use.

To take a specific instance, according to my invention, the faying surface of fuel tanks for aircraft are joined with a sealant compound of synthetic, rubber-based material containing a metallic oxide accelerator and a small quantity of X-ray opaque barium sulphate. After this assembly of the faying surfaces, which now contain at their interface a sealant with a uniform distribution of high X-ray coefficient material, the joints are X-rayed. The resulting X-ray photographs of the joint will readily show up voids or areas deficient in sealant. Consequently, a positive determination can be made of the sealed joint of the tank immediately after the assembly whereby any defective seals can be quickly spotted and the tank rejected.

Besides the above described use in containment tanks, this basic technique can be applied in a variety of instances. For example, various joints on aircraft are weather-sealed to prevent moisture and corrosion damage to various electrical, mechanical, and hydraulic components. However, sealants are used to form pressure seals about the canopies and windshields of aircraft where the cabins are maintained under pressure during high-altitude flight. But the specific sealants presently used for these various applications must contain a uniformly distributed predetermined quantity of material of high X-ray absorption coefficient mixed with it to permit the employment of the rapid and effective techniques herein disclosed. The sealants that are susceptible to the practice of the instant invention range from resins and plastics to natural and synthetic rubbers.

In the specific problem of effecting perfect seals in fuel tanks, it has been found that synthetic rubber based materials of the polysulfide type are outstanding since these rubbers possess excellent solvent and oil resistance, resist aging, ozone and sunlight and have low permeability to gases and vapors. A specific example of a composition which is a preferred embodiment of the instant invention is polysulfide rubber, LP-2, containing fifteen (15) percent by weight of barium sulphate. To this mixture is added a proper amount of an accelerator such as lead monoxide to produce a sealing compound with a viscosity of approximately 12,000 poises. The thus prepared sealant is ready for application to the faying edges either with a spatula or an extrusion gun. The faying edges are joined and mechanically fixed in place. The finished joint can now be examined by X-ray photography.

Although LP-2, $$\text{HS—(C}_2\text{H}_4\text{—O—CH}_2\text{—O—C}_2\text{H}_3\text{—S—S)}_{23}\text{—C}_2\text{H}_4\text{—O—CH}_4\text{—O—C}_2\text{H}_4\text{—SH}$$

is the preferred base sealant, LP-3 is also perfectly suitable for the instant application. Also accelerators, which act to polymerize or "cure" the synthetic rubber to a tough rubber solid, other than lead monoxide may be used such as lead peroxide and cumine peroxide to implement the instant invention. Likewise, other X-ray opaque materials such as powdered metals can be substituted for barium sulphate in many instances with equally satisfactory results.

Consequently, the instant invention obviates the prior difficulties encountered in inspection and evaluation of seals at the factory or in the field; the sealed condition can be accurately and quickly determined and the dilemma of taking a unit apart to check a suspicious seal only to totally destroy the seal is now completely overcome.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A composition of matter consisting of 0.1–25 percent by weight of barium sulphate, 5–20 percent by weight of lead monoxide and balance a polysulphide polymer.

2. A sealing composition for sealing structural elements consisting essentially of a synthetic rubber based material, lead monoxide accelerator and barium sulphate, said barium sulphate being characterized by a high coefficient of X-ray absorption whereby the effectiveness of the seal may be ascertained by X-ray inspection.

References Cited in the file of this patent
UNITED STATES PATENTS
1,580,857    Richards _____ Apr. 13, 1926